(No Model.)
L. DAVIS.
SAW CLAMP.
No. 275,603. Patented Apr. 10, 1883.
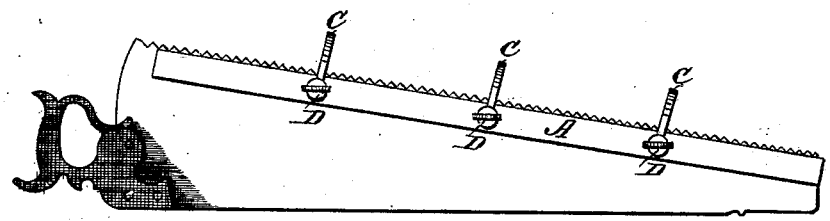
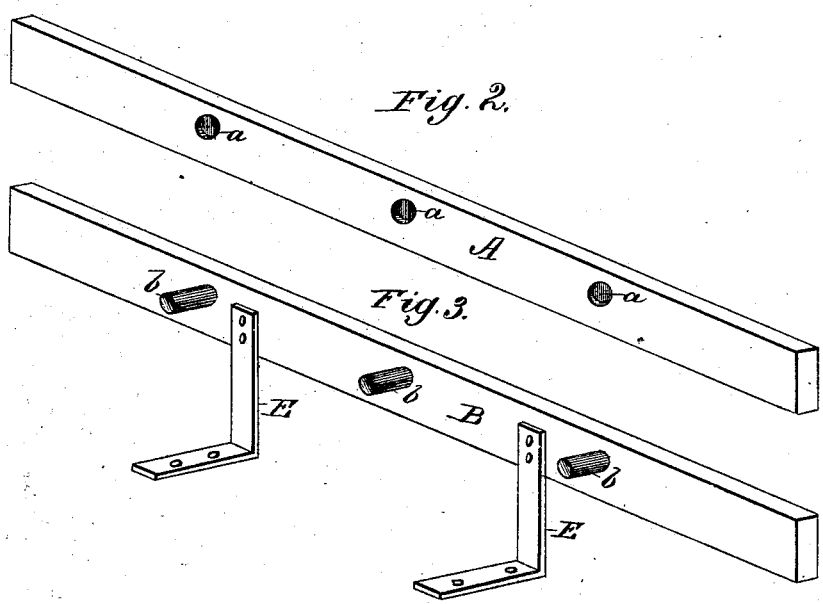
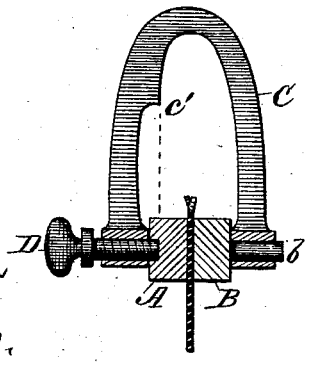
WITNESSES:
H. B. Brown
W. X. Stevens
INVENTOR:
Lewis Davis
BY
ATTORNEYS.

UNITED STATES PATENT OFFICE.

LEWIS DAVIS, OF JACKSON, OHIO.

SAW-CLAMP.

SPECIFICATION forming part of Letters Patent No. 275,603, dated April 10, 1883.

Application filed September 19, 1882. (No model.)

*To all whom it may concern:*

Be it known that I, LEWIS DAVIS, a citizen of the United States, residing at Jackson, in the county of Jackson and State of Ohio, have invented a new and useful Saw-Clamp, of which the following is a specification.

My invention relates to improvements in clamps for holding saws to be breasted down, set, and filed; and it consists in the construction and combination of parts hereinafter fully described and set forth, reference being had to the accompanying drawings, in which—

Figure 1 is an elevation of my device holding a handsaw. Fig. 2 is a front perspective view of one of the clamp-jaws. Fig. 3 is a perspective view of the other clamp-jaw and the angle-plates for fastening it to the bench; and Fig. 4 is an elevation, part in section, of the clamp and jaws.

All parts of the device are most properly made of malleable cast-iron.

A represents the front jaw, provided with holes or cups $a$, in which the points of the thumb-screws D are stepped when in use.

B is a similar jaw to A, but provided with small studs $b$, secured thereto for the purpose of holding clamps C in position, as at Fig. 4. The clamp C is a bow, provided with a screw-threaded hole at one end for thumb-screw D and a smooth hole at the other end to admit stud $b$. The office of this clamp-screw is to hold the two jaws rigidly upon the saw-blade, any number of these screws being used to keep the jaws together throughout their length.

E are angle-plates secured to the back of jaw B by means of rivets or screws, and provided with screw-holes, whereby the plates may be secured to any bench, table, fence, or log. As both the points of attachment of clamps C to jaws A and B are pivots, upon which the body of the clamp C might swing downward, there is danger of mashing the saw-teeth when the clamps are in use. To obviate this I have provided a shoulder, $c$, on the inner curve of clamp C, which will strike the jaw A before the highest part of the clamp would strike the saw-teeth, thus intercepting the fall of the clamp in season to prevent damage to the teeth.

Some of the advantages of my invention are that it may be quickly set up for use anywhere that a saw is required. It is prepared to hold the blade of the saw rigidly throughout its length, so that the whole length may be filed without changing the clamp and without the saw chattering. The edges of the jaws, being true, may serve as a guide in breasting down the old teeth, and, being iron, they are so rigid as to serve as a gage in setting the saw-teeth.

Having thus fully described my invention to enable others skilled in the art to make and use the same, what I claim as my invention, and wish to secure by Letters Patent, is—

1. The jaw A, provided with holes or cups $a$, and the jaw B, provided with studs $b$ in combination with one or more clamps, C, provided with a screw, D, at one end, and with a hole to receive the stud $b$ at the other end, substantially as specified.

2. The combination, with the two jaws A B and clamp C described, of the angle-plates E, secured to the back of the rear jaw and provided with holes, whereby the same may be secured by screws or nails to a bench or log, as specified.

3. The combination, with the jaws A B, of the clamp C, provided with the internal shoulder, $c$, as and for the purpose specified.

LEWIS DAVIS.

Witnesses:
 IRVINE DUNGAN,
 JAMES K. MCCLUNG.